Jan. 27, 1970
M. RAMSAY
3,491,919
METERING PUMP
Filed Feb. 15, 1968
2 Sheets-Sheet 1
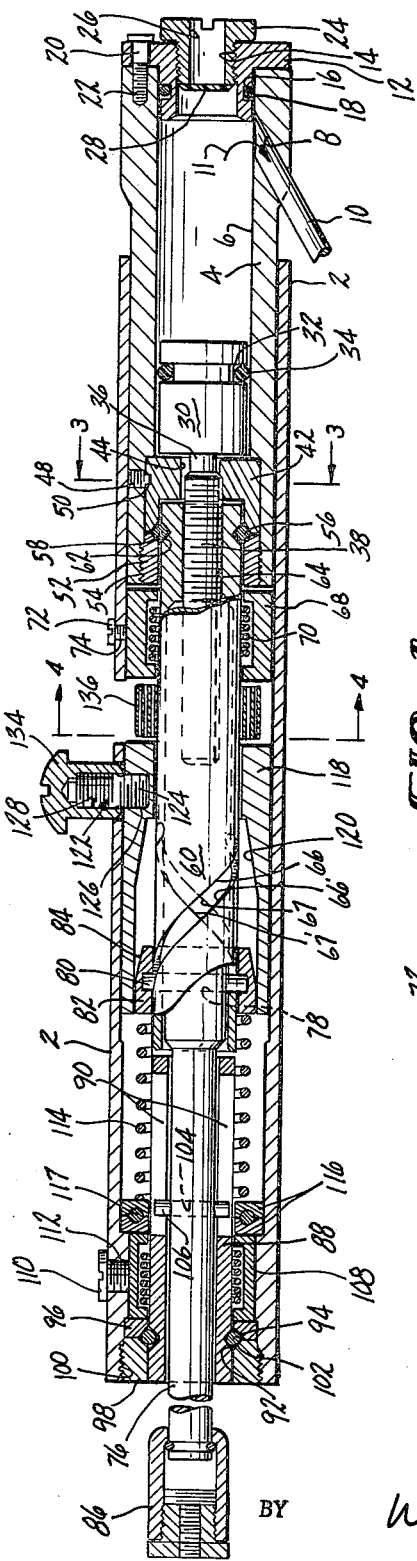
FIG-1
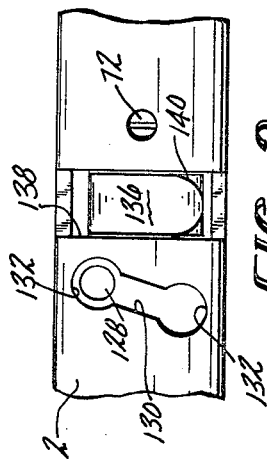
FIG-2
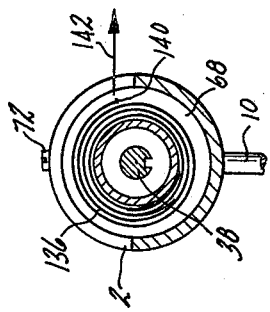
FIG-3
FIG-4
INVENTOR:
MARCUS RAMSAY
BY William W. Jones
ATTORNEY Jan. 27, 1970
M. RAMSAY
3,491,919
METERING PUMP
Filed Feb. 15, 1968
2 Sheets-Sheet 2
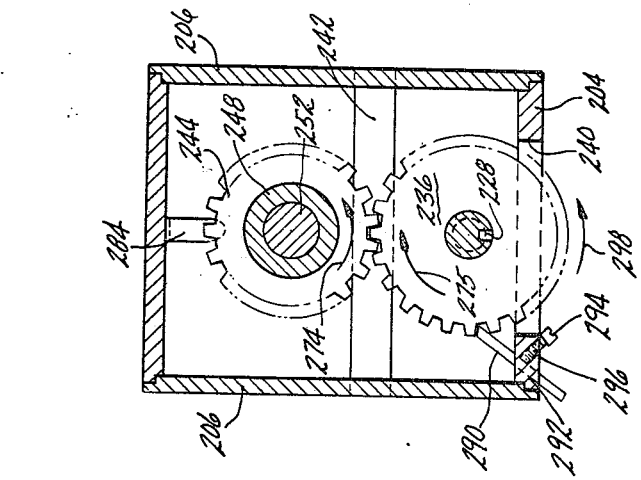
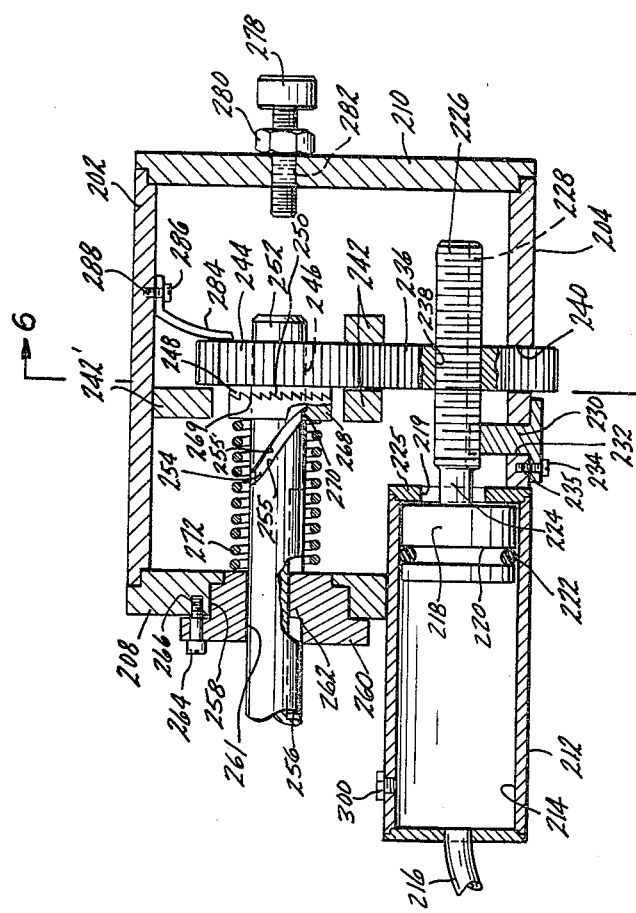
INVENTOR:
MARCUS RAMSAY
BY William W. Jones
ATTORNEY

United States Patent Office 3,491,919
Patented Jan. 27, 1970

3,491,919
METERING PUMP
Marcus Ramsay, New Haven, Conn., assignor to Olin Mathieson Chemical Corporation, a corporation of Virginia
Filed Feb. 15, 1968, Ser. No. 705,648
Int. Cl. G01f *11/06;* B67d *5/42*
U.S. Cl. 222—309     16 Claims

ABSTRACT OF THE DISCLOSURE

A metering pump having a non-rotatable, reciprocally movable piston with a threaded stem portion, drive means having a threaded portion engaging the threaded piston stem whereby rotational movement of the drive means imparts longitudinal movement to the piston by means of the threaded connection.

---

This invention concerns a metering pump which is capable of delivering a series of measured charges of a liquid, gas, or other pumpable substance.

It is known to provide a metering pump to deliver a series of measured charges through a feed line to a desired location. Such pumps of the prior art utilize a cylinder containing a piston which operates with a push-pull two phase stroke, wherein the substance to be pumped is fed into the cylinder prior to the push stroke. The push stroke of the piston serves to eject the substance from the cylinder and force it through the feed line, and the pull stroke of the piston is necessary to return the piston to its working position. The use of such a pump requires an associated storage tank to be used therewith from which the measured charges of the liquid, or the like being pumped, are fed into the pump cylinder. The use of such a pump and storage tank combination necessitates the use of a complex valving mechanism between the pump and the storage tank so that the pumped liquid will move into the pump cylinder at the proper time, and will not be pumped back into the storage tank during the push stroke of the piston. Furthermore, the pull stroke of the pump piston cavitates the cylinder thereby requiring the interposition of a valve between the cylinder and the feed line to insure that the liquid being pumped through the feed line is not subjected to the cavitation. Thus the use of a push-pull type pump to perform a metering function requires the addition of expensive and cumbersome parts in the system.

This invention concerns a metering pump having a cylinder and a piston wherein the liquid, or the like, is pumped from the cylinder during a push stroke of the piston, and wherein the piston does not require a subsequent pull stroke to position it for the next push stroke. The cylinder in the pump of this invention serves as a storage tank for a large quantity of liquid from which small charges are pumped by each push stroke of the piston. The piston is moved longitudinally through the cylinder by a progression of measured push strokes, each of which pumps a charge of liquid through a feed line, until the piston has pumped all of the liquid out of the cylinder. The piston is then returned to its initial position and the cylinder is refilled with a quantity of liquid to be pumped. Thus there is no cavitation in the cylinder during the pumping operation and no complex valves are needed to prevent back flow of the liquid in the feed line. Although the pump of this invention may be useful in any of a variety of environments, it has proven particularly efficacious when used in conjunction with a liquid propellant-actuated firearm disclosed in co-pending application S.N. 700,439, filed Jan. 25, 1968, by Dixon et al., now Patent No. 3,455,202 of July 15, 1969, which has been assigned to the assignee of this application.

It is, therefore, an object of this invention to provide a metering pump having a cylinder and a piston movable within the cylinder through a series of push strokes, each of which propels a charge of a liquid or the like through a feed line.

It is a further object of this invention to provide a metering pump of the character described, wherein the piston does not move through a pull stroke between adjacent push strokes.

It is yet another object of this invention to provide a metering pump of the character described, wherein the cylinder serves as a storage tank for a large volume of liquid, or the like to be pumped, from which small charges are propelled into a feed line by each push stroke of the piston.

It is still another object of this invention to provide a metering pump of the character described, wherein the length of the push stroke of the piston may be varied, thereby varying the size of the charge pumped into the feed line.

Other and further objects, advantages, and features of this invention will be apparent to those skilled in the art from the following descriptions together with the accompanying drawings, in which:

FIGURE 1 is a side sectional view of one embodiment of the pump of this invention;

FIGURE 2 is a top view of a portion of the pump of FIGURE 1 showing the means for varying the stroke of the piston;

FIGURE 3 is a sectional view taken along line 3—3 of FIGURE 1;

FIGURE 4 is a sectional view taken along line 4—4 of FIGURE 1;

FIGURE 5 is a side sectional view of a second embodiment of the pump of this invention; and FIGURE 6 is a sectional view taken along line 6—6 of FIGURE 5.

Referring now to FIGURE 1, an embodiment of the pump of this invention is shown which includes a cylindrical housing 2. One end of the housing 2 surrounds and supports a cylinder 4 having a bore 6. An outlet orifice 8 is disposed adjacent to one end of the cylinder 4 in communication with the bore 6, the outlet 8 being fitted with a tubular conduit 10 which carries the substance pumped out of the bore 6 to any environment into which the pumped substance is to be metered. The end of the cylinder 4 adjacent the outlet 8 is fitted with an annular collar 12 having an internally threaded passage 14 and an external groove 16 in which is seated a resilient sealing O-ring 18 of "Teflon," or the like. The collar 12 is affixed to the cylinder end wall by means of a plurality of bolts 20 (only one of which is shown) screwed into appropriate longitudinally extending threaded apertures 22 in the cylinder body. An end cap 24 having a central bore 26 and a frangible diaphragm 28 of "Teflon," or the like, stretched thereacross, is screwed into the collar to seal off the outlet end of the cylinder 4. The frangible diaphragm 28 serves a safety function by rupturing if the pressure within the cylinder 4 exceeds a predetermined critical value.

A piston 30 is slidably disposed in the opposite end of the cylinder 4, the piston 30 having an external groove 32 which contains a resilient O-ring of "Teflon," or the like, to seal that end of the cylinder 4. The piston 30 includes a stem 36 having a threaded portion 38, which threaded portion comprises a longitudinally extending slot 40, most clearly shown in FIGURE 3. An annular ring 42 is disposed behind the head of the piston 30, the ring 42 having a central passage 44 through which the piston stem 36 passes. The ring 42 further includes a key portion 46 (see FIGURE 3) which extends into the passage 44 and is disposed in sliding engagement with the slot 40 on the piston stem 36. This interengagement between key and slot prevents the piston 30 from rotating in the cylinder 4, but does not prevent the piston 30 from sliding longitudinally through the cylinder. The ring 42, is prevented from rotating by engagement with one or more set screws 48 screwed into one or more threaded apertures 50 in the wall of the cylinder 4. An annular closure member 52 having external threads is screwed into a threaded end portion 54 of the cylinder 4 into abutting engagement with one end wall of the ring 42. The inner corners of the adjacent end walls of the closure member 52 and the ring 42 are chamfered as at 56 to form the outer half of a race for a plurality of ball bearings 58.

A cylindrical drive member 60 is rotatably mounted in the housing 2, the drive member 60 extending into the closure member 52 and the ring 42. A V-shaped peripheral notch 62 is cut into the outside surface of the drive member 60 opposite the chamfers 56 to form the other half of the race for the ball bearings 58. The drive member 60 is thus freely rotatable within the closure 52 and ring member 42, but is restrained from longitudinal movement therein by the ball bearings 58 and race, and by the ring 42 itself. The drive member 60 includes an internally threaded portion 64 at one end thereof which is screwed onto the threaded portion 38 of the piston stem 36 although conventional threads can be used, the threads 38 and 64 are preferably double threads to increase the driving characteristics of the threaded engagement. The other end of the drive member 60 includes a pair of helical slots each defining a pair of opposed, radially extending helical surfaces 66 and 66', and 67 and 67', the purpose of which is set forth hereinafter.

First clutch means are disposed in engagement with the outside surface of the drive member 60 to permit the drive member 60 to rotate in one direction while preventing rotation of the drive member 60 in the opposite direction. The first clutch means includes an annular housing 68 through which the drive member 60 passes. A coil spring 70 is disposed in the housing 68 and attached thereto. The spring 70 is in frictional engagement with the outside surface of the drive member 60. When the drive member 60 is rotated in one direction, the coil spring 70 loosens its grip on the member 60 by tending to unwind and the member 60 is thus free to rotate in this one direction. However, when the drive member 60 begins to rotate in the other direction, the spring 70 tightens its grip by tending to wind up, thus the member 60 is prevented from rotating in the other direction. The housing 68 is rendered immobile with respect to the housing 2 by means of a screw 72 which is screwed into a threaded aperture 74 disposed in the housing 2. It is understood that any one of a number of clutch devices which will permit the drive member 60 to rotate in only one direction may be used in lieu of the device heretofore described.

An operating rod 76 is slidably disposed in the housing 2 and extends into the end of drive means 60 adjacent the helical slots. The operating rod 76 includes a first transversely extending aperture 78 in which a pin 80 is placed. The pin 80 extends outwardly beyond the operating rod 76 and into both helical slots to slidably engage to helical surfaces 66, 66', 67, and 67'. The ends of the pin 80 are disposed in engagement with an annular collar 82 which is slidably mounted on the outer surface of the drive member 60. The leading edge 84 of the collar 82 is inwardly and forwardly tapered, the purpose of the taper being set forth hereinafter. The outer end of the operating rod 76 is attached to a connector 86 which in turn is attached to a push-pull reciprocating mechanism (not shown). The connection between the operating rod 76 and the connector 86 is such that the rod 76 may rotate in both directions with respect to the connector 86.

An annular sleeve 88 having a pair of opposed longitudinally extending slots 90 therein is disposed in the end of the housing 2 remote from the cylinder 4, the sleeve slidingly engaging the operating rod 76. A V-shaped notch 92 is cut into the outside surface of the sleeve 88 to form half of a race for retaining a plurality of ball bearings 94. A ring member 96 and an annular closure member 98, which is screwed into a threaded end portion 100 of the housing 2, are disposed in sliding engagement with the outside surface of the sleeve 88. The adjacent inside edges of the ring 96 and closure member 98 are chamfered, as at 102 to form the other half of the race for the ball bearings 94. The ball bearings 94 and race thus provide for rotational movement of the sleeve 88 but prevent its longitudinal movement. A pin 106 is frictionally fitted into a transversely extending aperture 104 in the operating rod 76, the pin 106 slidingly engaging the walls of the slots 90 in the sleeve 88.

Second clutch means 108, of similar structure as the first clutch means described hereinbefore, is disposed in sliding engagement with the outside surface of the sleeve 88. The second clutch means 108 permits the sleeve 88 to rotate in the same direction which the drive means 60 rotates, and prevents the sleeve 88 from rotating in the same direction as the drive means 60 is prevented from rotating. The second clutch means 108 is secured to the housing 2 by means of a set screw 110 which is screwed into a threaded aperture 112 in the housing wall. It is readily apparent that the rotational movement of the operating rod 76 will be controlled by the sleeve 88 by means of the connection between the pin 106 and walls of the slots 90 in the sleeve 88.

A compressible spring 114 is disposed in the housing 2 and is seated against the collar 82 on one hand and a pair of rings 116 on the other hand. The rings 116 are rotatable with respect to each other by means of an interposed race having ball bearings 117. The spring 114 serves to bias the collar 82 and thereby the operating rod 76 toward the cylinder-end of the housing 2.

An annular stop member 118 is mounted in the housing 2 slidably engaging the outside surface of the drive member 60. The stop member 118 includes an inwardly tapering surface 120 which is spaced apart a predetermined distance from the tapered surface 84 on the collar 82. The stop member 118 is affixed to the housing 2 by means of a post member 122 having a left-hand threaded portion 124 screwed into a threaded aperture 126 in the stop member 118, and further having a right-hand threaded portion 128 extending outwardly through a slot 130 in the housing 2 (see FIGURE 2). The axis of the slot 130 is disposed at an angle to the axis of the housing 2 with the opposite end portions 132 and 132' of the slot 130 being enlarged. An enlarged cap 134 is screwed onto the threaded portion 128 with the bottom of the cap 134 being brought into engagement with the wall of one of the enlarged slot portions 132 or 132' to lock the stop member 118 to the housing 2. FIGURE 2 shows the slot 130 and the threaded portion 128 of the post 126, with the cap 134 removed for clarity. If the cap 134 is removed from the post 126, the latter can be moved between the enlarged slot portions 132 and 132' thereby providing means for varying the distance between the collar tapered surface 84 and the stop tapered surface 120.

The pump of this invention operates in the following manner. The piston 30 is initially disposed, as shown, at the left hand side of the cylinder 4 and that portion of the cylinder bore 6 to the right of the piston 30 is filled with a substance, such as a liquid, to be pumped. The clutches 68 and 108 are so constructed as to permit the drive member 60 and the operating rod 76 to rotate only in a counter-clockwise direction. The operating rod 76 is drawn to the left to compress the spring 114, with the pin 80 being at the left end of the helical slots, and the operating rod 76 is held in this position by releasable means not shown. The operating rod 76 is then released and the spring 114 drives the collar 82, the pin 80, and the operating rod 76 to the right. The pin 80 is thus driven against the helical surfaces 66 and 67. The pin 80 moving against the helical surfaces 66 and 67 results in a force which tends to rotate the drive member 60 in a counter-clockwise direction, while an equal and opposite force is generated which tends to rotate the operating rod 76 in a clockwise direction. The clutch 108 prevents the operating rod 76 from rotating in the clockwise direction however, thus the drive member 60 is rotated when the operating rod 76 is driven from left to right. When the drive member 60 is thus rotated, its threaded portion 64 obviously also rotates. Since the piston stem 36 is prevented from rotating by the key 46 and slot 40, the piston 30 is driven to the right by the rotating engagement between the piston stem threaded portion 38 and the drive member threaded portion 64.

The rotation of the drive member 60 is stopped by engagement between the tapered surface 84 on the collar 82 and the tapered surface 120 on the stop member 118, which engagement also stops the movement of the operating rod 76. The surfaces 84 and 120 are tapered to provide a positive interlock to deter the drive member 60 from over-spinning. It is thus apparent that by moving the stop member 118 to change the distance between the tapered surfaces 84 and 120, one can vary the length of the piston stroke. Thus upon each push stroke of the operating rod 76 to the right, the piston 30 is moved to the right a predetermined distance to force a portion of the liquid out of the cylinder bore through the outlet conduit 10, the direction of flow being indicated by the arrow 11.

After each push or drive stroke of the operating rod 76, the latter is returned through a pull or return stroke to the left to the position shown in FIGURE 1. When the operating rod 76 is pulled to the left, the pin 80 engages the helical surfaces 66' and 67', which engagement generates a force tending to rotate the drive member 60 in a clockwise direction, and an equal and opposite force tending to rotate the operating rod 76 in a counter-clockwise direction. The clutches 68 and 70 will not permit the drive member to rotate in a clockwise direction, thus the operating rod 76 rotates on the pull stroke. It is readily apparent that since the drive member 60 does not rotate during the pull stroke, the piston 30 will not move during the pull stroke. Thus, the push stroke of the operating rod 76 results in a pumping stroke in the piston 30 to the right, and the pull stroke of the operating rod 76 results in no movement of the piston 30. Therefore, the piston 30 is moved in predetermined increments to the right by each successive push stroke of the operating rod 76, until the piston 30 has completely traversed the cylinder 4 and pumped all the liquid from the latter in separate pulses. When all of the liquid has been pumped out of the cylinder bore 6, the piston 30 is returned to its original position in the following manner. The screws 72 and 110 are loosened thereby freeing the housings of the clutches 68 and 70, and 108 for rotational movement in both directions with respect to the housing 2. The drive member 60 has disposed thereabout a spirally coiled metallic strip 136 having a free end 140. The strip 136 is permanently stressed into the spiral configuration and is accessible from the exterior of the pump through a slot 138 in the housing 2. After the screws 72 and 110 are loosened, the free end 140 of the strip 136 is grasped and is pulled in the direction of the arrow 142 (see FIGURE 4). As the strip 136 is thus pulled, it frictionally engages the drive member 60 and causes the latter to rotate in a clockwise direction, which rotation returns the piston 30 to the left. The strip 136 is then released and re-coils itself about the drive member 60, and is then pulled again. This is repeated until the piston 30 has been completely returned to the position shown in FIGURE 1. The screws 72 and 110 are then retightened, the cylinder bore 6 is refilled with liquid, and the pump is ready to use again.

Referring now to FIGURES 5 and 6, a second embodiment of the pump of this invention is disclosed. The pump includes a housing having top and bottom walls 202 and 204 respectively, side wall 206, and front and back walls 208 and 210 respectively. A cylinder 212 is mounted on the housing, the cylinder 212 extending forwardly from the front wall 208 and being attached thereto and attached to the bottom wall 204. The cylinder 212 includes an axial bore 214 having an outlet conduit 216 communicating therewith. A piston 218 is slidably mounted in the cylinder bore 214, the piston 218 having an external groove 220 in which is disposed a resilient sealing O-ring 222 of "Teflon," or the like, to seal the piston-end of the cylinder. The piston 218 includes a stem 224 extending through an aperture 219 in the rear wall 225 of the cylinder 212. The stem 224 has a threaded portion 226 and further includes a longitudinally extending slot 228 therein. A key member 230 extends through an aperture 232 in the housing bottom wall to slidingly engage to walls of the piston stem slot 228, the key 230 serving to prevent the piston 218 from rotating while permitting longitudinal movement of the piston. The key 230 is attached to the housing bottom wall 204 by means of a screw 234 which engages the key and which is screwed into a threaded aperture 235 in the bottom wall.

A first spur gear wheel 236 having a threaded axial aperture 238 is screwed onto the threaded piston stem portion 226. The threads 226 and 238 are preferably double threads. The gear wheel 236 extends downwardly through a slot 240 in the housing bottom wall 204 so as to be accessible from outside the housing. A pair of laterally extending bars 242 are disposed on either side of the gear wheel 236 to prevent the latter from moving longitudinally within the housing while permitting the gear wheel 236 to rotate freely about the piston stem.

A second spur gear wheel 244 is mounted in the housing above and in gearing engagement with the first gear wheel 236, as is clearly shown in FIGURE 6. The gear wheel 244 includes an axial bore 246 and an annular hub member 248 having ratchet teeth 250. An operating rod 252 is mounted in the housing for reciprocal movement therein, the rod 252 passing through the gear wheel bore 246. The rod 252 includes a helical groove 254 defining opposed radially extending helical surfaces 255 and 255'. The rod further includes a longitudinally extending slot 256. It is noted that the bars 242 are adjacent to the lower portion of the gear wheel 244 and serve to prevent the latter from moving longitudinally within the housing while permitting rotational movement of the gear wheel 244 about the rod 252. A second bar 242' is disposed adjacent the upper portion of the gear wheel 244 and serves the same function as the bars 242.

The front wall 208 of the housing includes an aperture 258 into which is fitted an annular collar member 260 having an axial passage 261. The rod 252 passes through the passage 261 and is slidably movable therein. The collar 260 further includes a key 262 which extends radially into the passage 261 and is disposed in the rod slot 256 in sliding engagement with the walls thereof. The key 262 and collar 260 combine to prevent the rod 252 from rotating, while freely permitting it to move longitudinally. The collar 260 is attached to the housing front wall 208 by means of at least one bolt 264 which engages the collar and which is screwed into a threaded aperture 266 in the housing front wall.

An annular ratchet member 268 is slidably mounted on the rod 252, the ratchet member 268 having a plurality of ratchet teeth 269 which engage the ratchet teeth 250 on the gear wheel 244. The ratchet engagement is such that rotation of the ratchet member 268 in one direction results in a driving of the gear wheel 244, while rotation of the ratchet member 268 in the other direction merely results in a slipping of the ratchet teeth, which type of ratchet engagement is, of course, known. The ratchet member 268 further includes an inwardly extending stud 270 which is disposed in the operating rod helical groove 254 to slidingly engage the helical surfaces 255 and 255'. A spring member 272 is disposed in the housing to bias the ratchet teeth 269 and 250 into engagement.

The second embodiment of the pump of this invention operates in the following manner. The cylinder bore 214 is filled with a liquid to be pumped. Means (not shown) are connected to the operating rod 252 to move it to the right on a drive stroke, and subsequently to the left on a return stroke. The key 262 prevents the rod 252 from rotating when the latter is moved on its drive and return strokes. When the operating rod 252 is moved through its drive stroke, the helical surface 255 is moved against the ratchet stud 270 so that the latter slides along the helical surface 255 causing the ratchet member 268 to rotate in a counter-clockwise direction. When the ratchet member 268 is thus rotated, the ratchet teeth 250 and 269 engage, the gear wheel 244 is rotated in the direction of the arrow 274, and the gear wheel 236 is rotated in the direction of the arrow 275, in FIGURE 6. A bolt 278 having a lock nut 280 is threaded into an aperture 282 and extends into the inside of the housing. The bolt 278 is coaxial with the operating rod 252 and provides an adjustable stop for varying the length of the operating rod drive stroke.

When the gear wheel 236 is rotated in the direction of the arrow 275, the threaded engagement between the gear 236 and the threaded portion 226 of the piston stem 224 causes the piston 218 to move to the left in the cylinder bore 214. Thus a charge of liquid is pumped out through the outlet 216. A flexible blade spring 284 is attached to the housing top wall 202 by means of a screw 286 which engages the spring 284 and which is screwed into a threaded aperture 288 in the top wall. The spring 284 frictionally engages the gear wheel 244 to provide a brake which prevents the gear wheel 244 from continuing counter-clockwise rotational movement from its own momentum after the completion of the drive stroke of the operating rod.

A pawl 290 is mounted in an aperture 292 in the bottom wall 204 of the housing, the pawl 290 engaging the splines on the periphery of the gear wheel 236 so as to permit the latter to rotate in the direction of the arrow 275 while preventing rotation in the direction of the arrow 298. The pawl 290 is affixed to the housing by engagement with a set screw 294 which is screwed into a threaded aperture 296 which intersects the aperture 292. Thus the pawl 290 allows the gear wheel 236 to rotate when the operating rod 252 is moved through its drive stroke.

When the operating rod 252 is moved through its return stroke, the helical surface 255' is moved against the ratchet lug 270 and the latter slides along the former. This movement causes the ratchet member 268 to rotate in a clockwise direction whereby the ratchet teeth 250 and 269 slide over one another without rotating the gear wheel 244 in a clockwise direction.

The operating rod 252 is thus reciprocated through a series of drive and return strokes with each drive stroke causing the piston 218 to pump an amount of liquid out of the cylinder bore 214. It is noted that the piston 218 during the pumping, only moves through a work stroke, there being no return stroke. When the piston 218 has moved to the extreme left of the cylinder bore 214 and the liquid has all been pumped out of the cylinder 212, the pump is re-set for further pumping in the following manner. The screw 294 is loosened and the pawl 290 is withdrawn from engagement with splines on the gear wheel 236. The screw 264 is then loosened sufficiently to permit removal of the collar 260 from the aperture 258 thereby releasing the ratchet member 268 from engagement with the spring 272. The ratchet teeth 250 and 269 are then disengaged by sliding the ratchet member 268 to the left along the operating rod 252. The gear wheel 236 is then manually rotated in the direction of the arrow 298 by thumbing that portion of the wheel 236 which projects through the housing aperture 240. The piston 218 is thus moved to the right until it returns to the position shown in FIGURE 5. A plugged inlet 300 is then opened to permit filling of the cylinder bore 214 with the liquid to be pumped and the inlet 300 is replugged. Obviously, the inlet 300 can be unplugged before the piston 218 is returned to its initial position. The collar 260, ratchet member 268, and pawl 290 are then re-set as shown in FIGURES 5 and 6 and the pump is again ready for use.

The pump of this invention advantageously performs a precisely controlled and dependable metering operation without the use of complicated valves. This pump also eliminates the necessity of using a separate storage tank for material to be pumped by utilizing the piston cylinder itself as a storage area. The elimination of the pump-cavitating pull stroke of the pump piston of this invention minimizes the chance of back-flow of the pumped material in between working strokes. Furthermore, means are provided for easily adjusting the amount of material to be pumped during each work stroke of the piston thereby providing a pump which can be used over a broad range of metering operations, and providing flexibility should the metered amount necessarily be altered during any single metering operation.

Although reference has been made to particular embodiments of the present invention, various modifications will readily suggest themselves to those skilled in the art.

What is claimed is:
1. A metering pump comprising:
   (a) a cylinder having a bore and an outlet end;
   (b) a piston mounted in said cylinder bore and reciprocally movable therein, said piston having a threaded stem;
   (c) means engaging said piston to prevent the latter from rotating but permitting said piston to move longitudinally;
   (d) rotatable drive means having a threaded portion engaging said threaded piston stem;
   (e) means engaging said drive means to hold the latter against longitudinal movement while permitting rotational movement;
   (f) cylindrical operating means coaxial with at least a part of said drive means and reciprocally movable along its axis through a drive stroke and a return stroke;
   (g) means connecting said operating means to said drive means and operable to rotate said drive means about said threaded piston stem when said operating means is moved through its drive stroke, the rotation of said drive means imparting to said piston longitudinal movement toward said cylinder outlet end; and
   (h) a housing supporting said cylinder, said drive means, and said operating means.

2. The pump of claim 1, further comprising clutch means connected to said drive means operative to permit rotation of said drive means when said operating means is moved through its drive stroke and further operative to prevent rotation of said drive means when said operating means is moved through its return stroke.

3. The pump of claim 1, wherein the threads on said threaded piston stem and said threaded drive means portion are double threads.

4. A metering pump comprising:
   (a) a cylinder having a bore and an outlet end;
   (b) a piston mounted in said cylinder bore and reciprocally movable therein, said piston having a threaded stem;

(c) means engaging said piston to prevent the latter from rotating but permitting said piston to move longitudinally;

(d) a rotatable cylindrical member having a threaded portion engaging said threaded piston stem, said cylindrical member further including first and second opposed, generally radially extending helical surfaces;

(e) means engaging said cylindrical member to hold the latter against longitudinal movement while permitting rotational movement;

(f) pin means for slidably engaging said helical surfaces;

(g) movable operating means connected to said pin means and operative to slide the latter along said first helical surface on a drive stroke, and further operative to slide said pin means along said second helical surface on a return stroke;

(h) first clutch means engaging said cylindrical member and operative to permit rotation of said cylindrical member during the drive stroke of said operating means while preventing rotation of said cylindrical member during the return stroke of said operating means;

(i) second clutch means engaging said operating means and operative to prevent rotation of the latter during its drive stroke while permitting rotation of said operating means during its return stroke; whereby said pin means sliding along said first helical surface during the drive stroke imparts rotational movement to said cylindrical member thereby causing longitudinal movement of said piston by means of the threaded connection between said cylindrical member and said piston stem, and whereby said pin means sliding along said second helical surface during the return stroke imparts rotational movement to said operating means; and (j) a housing supporting said cylinder, said operating means, and said first and second clutch means.

5. The pump of claim 4, wherein said cylindrical member comprises a helical slot having opposed side walls defining said first and second helical surfaces.

6. The pump of claim 4, further comprising movable stop means connected to said housing and engageable with said operating means to adjustably limit the length of said drive stroke.

7. The pump of claim 4, wherein the threads on said piston stem and said cylindrical member are double threads.

8. The pump of claim 4, further comprising spring means connected to said operating means to impel the latter through said drive stroke.

9. The pump of claim 4, further comprising:

(k) means connected to said housing and to said first and second clutch means and operative to neutralize said first and second clutch means; and (l) piston return means connected to said cylindrical member operable to move said piston away from said cylinder outlet end when said first and second clutch means have been neutralized.

10. The pump of claim 9, wherein said piston return means is a spirally coiled strip of metal wound around said cylindrical member in frictional engagement therewith.

11. A metering pump comprising:

(a) cylinder having a bore and an outlet end;

(b) a piston mounted in said cylinder bore and reciprocally movable therein, said piston having a threaded stem;

(c) means engaging said piston to prevent the latter from rotating;

(d) a rotatable cylindrical member having a threaded portion engaging said threaded piston stem;

(e) means engaging said cylindrical member to hold the latter against longitudinal movement;

(f) means connected to said cylindrical member and operative to permit said cylindrical member to rotate in a predetermined direction while preventing said cylindrical member from rotating in the opposite direction;

(g) rotatable operating means connected to said cylindrical member to rotate the latter;

(h) a rod reciprocally movable through a drive stroke and a return stroke, said rod having first and second opposed, substantially radially extending helical surfaces thereon;

(i) means engaging said rod to prevent the latter from rotating during said drive and return strokes;

(j) ratchet means connected to said operating means, said ratchet means engaging said first helical surface during said drive stroke, and engaging said second helical surface during said return stroke, said ratchet means further being operative to rotate said operating means during said drive stroke and being inoperative to rotate said operating means during said return stroke; and (k) housing means supporting said cylinder, said piston, said operating means, and said rod.

12. The pump of claim 11, wherein said rod includes a helical slot having side walls defining said first and second helical surfaces.

13. The pump of claim 11, further comprising stop means movably connected to said housing for engagement with said rod to adjustably limit the length of the drive stroke.

14. The pump of claim 11, further comprising means connected to said housing, and engaging said cylindrical member and said drive means to hold the latter two against longitudinal movement during said drive and return strokes while permitting rotational movement.

15. The pump of claim 11, wherein said cylindrical member and said drive means are spur gears having intermeshing splines.

16. The pump of claim 11, wherein the threads on said piston stem and on said cylindrical member are double threads.

References Cited

UNITED STATES PATENTS

| | | | |
|---|---|---|---|
| 2,080,343 | 5/1937 | Smith | 222—390 X |
| 2,349,714 | 5/1944 | Finkelstein | 222—390 X |
| 2,407,208 | 9/1946 | Sherwood | 222—390 X |

FOREIGN PATENTS

| | | |
|---|---|---|
| 518,222 | 2/1940 | Great Britain. |

SAMUEL F. COLEMAN, Primary Examiner

H. S. LANE, Assistant Examiner

U.S. Cl. X.R.

222—340, 390, 391